United States Patent
Aleksandrovich et al.

(10) Patent No.: US 11,947,927 B2
(45) Date of Patent: Apr. 2, 2024

(54) SORTING UNSORTED ROWS OF A COMPOSITE DATASET AFTER A JOIN OPERATION

(71) Applicant: YAHOO ASSETS LLC, Dulles, VA (US)

(72) Inventors: George Aleksandrovich, Hoffman Estates, IL (US); Allie K. Watfa, Urbana, IL (US); Robin Sahner, Urbana, IL (US); Mike Pippin, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 356 days.

(21) Appl. No.: 16/727,261

(22) Filed: Dec. 26, 2019

(65) Prior Publication Data

US 2021/0200512 A1 Jul. 1, 2021

(51) Int. Cl.
*G06F 16/00* (2019.01)
*G06F 7/08* (2006.01)
*G06F 16/2455* (2019.01)

(52) U.S. Cl.
CPC ............ *G06F 7/08* (2013.01); *G06F 16/2456* (2019.01)

(58) Field of Classification Search
None
See application file for complete search history.

(56) References Cited

U.S. PATENT DOCUMENTS

| | | | |
|---|---|---|---|
| 5,724,600 A * | 3/1998 | Ogi | G06F 9/5083 |
| | | | 712/31 |
| 6,519,593 B1 * | 2/2003 | Matias | G06F 7/24 |
| 9,442,694 B1 * | 9/2016 | Boehme | G06F 7/36 |
| 9,886,474 B2 * | 2/2018 | De Smet | G06F 16/244 |
| 10,121,060 B2 * | 11/2018 | Shoemaker | G06V 40/173 |
| 10,142,396 B2 * | 11/2018 | Kennedy | H04L 67/52 |
| 10,346,358 B2 * | 7/2019 | Gorelik | G06F 16/211 |
| 10,482,092 B2 * | 11/2019 | Dispensa | G06F 16/9535 |
| 10,545,976 B2 * | 1/2020 | Silverstein | G06F 16/80 |
| 10,572,498 B2 * | 2/2020 | Silverstein | G06F 16/80 |
| 11,210,278 B1 * | 12/2021 | Dean | G06F 16/2453 |
| 2012/0117054 A1 * | 5/2012 | Shrinivas | G06F 16/24545 |
| | | | 707/E17.131 |
| 2013/0013862 A1 * | 1/2013 | Kannan | G06F 12/0877 |
| | | | 711/119 |
| 2015/0356094 A1 * | 12/2015 | Gorelik | G06F 16/2457 |
| | | | 707/748 |
| 2016/0171092 A1 * | 6/2016 | Mueller | G06N 5/022 |
| | | | 707/771 |
| 2017/0060829 A1 * | 3/2017 | Bhatt | G06F 40/169 |
| 2018/0089258 A1 * | 3/2018 | Bhattacharjee | G06F 16/24535 |

(Continued)

*Primary Examiner* — Farhan M Syed
(74) *Attorney, Agent, or Firm* — James J. DeCarlo; Greenberg Traurig, LLP

(57) ABSTRACT

Disclosed are embodiments for sorting rows of a dataset after a JOIN operation. In one embodiment, a method is disclosed comprising performing a JOIN operation on an annotation dataset, the performing of the JOIN operation generating an unordered dataset; grouping a plurality of rows in the unordered dataset into a plurality of buckets, the grouping performed based on a root dataset associated with the annotation dataset; sorting each bucket, the sorting comprising sorting each bucket independently; and combining each sorted bucket into a sorted dataset.

20 Claims, 9 Drawing Sheets

(56) References Cited

U.S. PATENT DOCUMENTS

| | | | |
|---|---|---|---|
| 2018/0089306 A1* | 3/2018 | Pal | G06F 16/24535 |
| 2018/0089312 A1* | 3/2018 | Pal | G06F 16/335 |
| 2018/0089324 A1* | 3/2018 | Pal | G06F 9/546 |
| 2018/0307716 A1* | 10/2018 | Chen | G06F 16/25 |
| 2018/0365292 A1* | 12/2018 | Sivathanu | G06F 16/283 |
| 2019/0073195 A1* | 3/2019 | Arnold | H04L 47/125 |
| 2019/0228014 A1* | 7/2019 | Liu | G06F 16/2456 |
| 2019/0258636 A1* | 8/2019 | Bhattacharjee | G06F 16/24549 |
| 2019/0310977 A1* | 10/2019 | Pal | G06F 9/5077 |
| 2020/0050586 A1* | 2/2020 | Pal | G06F 16/1734 |
| 2020/0050607 A1* | 2/2020 | Pal | G06F 16/24549 |
| 2020/0050612 A1* | 2/2020 | Bhattacharjee | G06F 16/24526 |
| 2020/0065303 A1* | 2/2020 | Bhattacharjee | G06F 16/278 |
| 2020/0117650 A1* | 4/2020 | Yan | G06F 7/08 |
| 2020/0348907 A1* | 11/2020 | Krasner | G06F 16/2264 |
| 2020/0364223 A1* | 11/2020 | Pal | G06F 16/24539 |

* cited by examiner

SORTING UNSORTED ROWS OF A COMPOSITE DATASET AFTER A JOIN OPERATION

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to distributed data processing and, in particular, to techniques for reordering a composite dataset after performing a JOIN operation that returns rows out of order.

In big data and distributed processing systems such as Hadoop, it is common to amass large data sets based on, for example, high-velocity data such as clickstream data. For downstream processing of such data, it is frequently common to add additional data to the original data sets (referred to as annotating data). In current systems, adding annotations involves a duplication of the original data, forming a new dataset that includes the original data and the new annotation data. For example, annotating clickstream data comprises copying the entire clickstream data set and adding one or more columns to the data set and then populating these new columns with the annotation data. The result is that current systems are required to read and process entire data sets as well as duplicate the same data across additional files. Frequently, current systems perform this copying multiple times as annotations can be added on already annotate data. Thus, if a previously annotate dataset is annotated again, the original data is copied twice, resulting in three copies of the same data.

BRIEF SUMMARY

In a distributed system, scripts that process annotated datasets generally rely on JOIN operations (self, inner, outer, etc.) to manipulate the underlying data. By default, in languages such as Pig, there is no guarantee that the rows of a dataset will be returned in order. Thus, one solution comprises performing a merge sort (or similar sort) to order rows based on a key. However, this solution results in an n·log(n) complexity given the presence of n! permutations and the halving of permutations on each iteration of the sorting algorithm. While this technique may be suitable for small datasets, it fails to operate efficiently at scale. Thus, there is a current need in the art to provide a technique for reordering rows of a dataset in an efficient manner following a JOIN operation.

The disclosed embodiments solve these and other technical problems by providing a storage layer for a distributed storage system that allows for the creation and access of annotation data layers. In some embodiments, the disclosed embodiments are provided as a storage layer on a Hadoop system, although the disclosed embodiments are not limited to such a system. The various techniques described herein may be implemented as a hybrid file format implemented as a thin wrapper layer on a distributed file system.

In one embodiment, a method is disclosed comprising performing a JOIN operation on an annotation dataset, the performing of the JOIN operation generating an unordered dataset; grouping a plurality of rows in the unordered dataset into a plurality of buckets, the grouping performed based on a root dataset associated with the annotation dataset; sorting each bucket, the sorting comprising sorting each bucket independently; and combining each sorted bucket into a sorted dataset.

In another embodiment, a non-transitory computer-readable storage medium for tangibly storing computer program instructions capable of being executed by a computer processor is disclosed, the computer program instructions defining the steps of performing a JOIN operation on an annotation dataset, the performing of the JOIN operation generating an unordered dataset; grouping a plurality of rows in the unordered dataset into a plurality of buckets, the grouping performed based on a root dataset associated with the annotation dataset; sorting each bucket, the sorting comprising sorting each bucket independently; and combining each sorted bucket into a sorted dataset.

In another embodiment, an apparatus is disclosed comprising: a processor; and a storage medium for tangibly storing thereon program logic for execution by the processor, the stored program logic causing the processor to perform the operations of performing a JOIN operation on an annotation dataset, the performing of the JOIN operation generating an unordered dataset; grouping a plurality of rows in the unordered dataset into a plurality of buckets, the grouping performed based on a root dataset associated with the annotation dataset; sorting each bucket, the sorting comprising sorting each bucket independently; and combining each sorted bucket into a sorted dataset.

DETAILED DESCRIPTION

Figure 1:
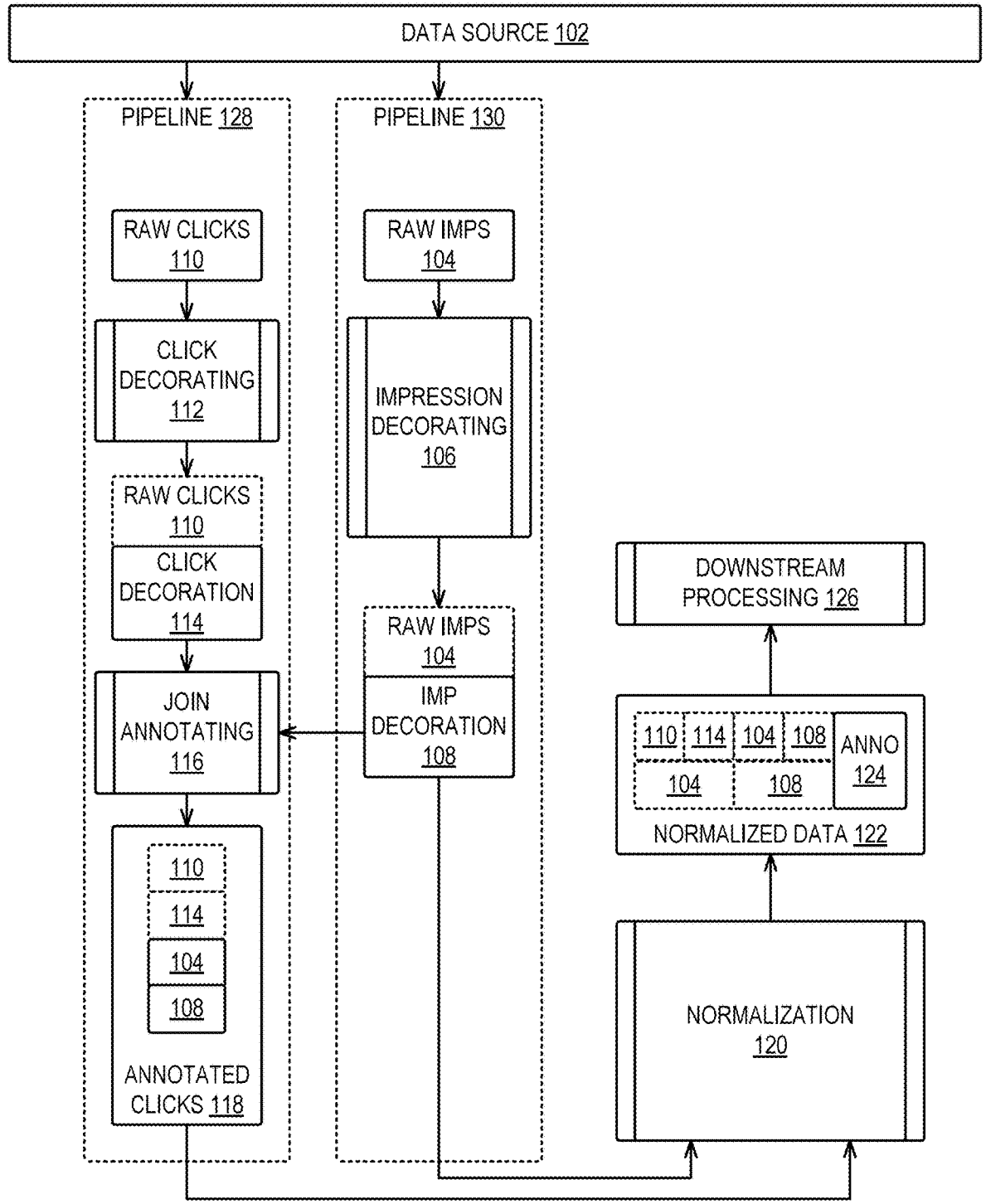
FIG. 1 is a system diagram illustrating a distributed processing system according to some embodiments of the disclosure.

FIG. 1 is a system diagram illustrating a distributed processing system according to some embodiments of the disclosure.

In the illustrated embodiment, a plurality of pipelines (128, 130) process data from a data source (102). In one embodiment, data source (102) can comprise a data lake or similar big data storage device. In the illustrated embodiment, the data source (102) can include a large volume of unstructured data. In some embodiments, the data source (102) can include structured data such as column-oriented data. In some embodiments, the data source (102) can comprise log file data storage or similar types of storage. In some embodiments, the data source (102) stores data in structured filetypes such as Orc or Parquet filetypes.

In the illustrated embodiment, the pipelines (128, 130) comprise distributed processing pipelines. Each pipeline (128, 130) may comprise a plurality of distributed computing devices. In one embodiment, each pipeline (128, 130) can read data from the data source (102), process the data, and load the data into a structured data repository. In some embodiments, all of the above processing may be done in a distributed computing environment running on commodity hardware (e.g., a Hadoop cluster or similar cluster).

The illustrated pipelines (128, 130) further illustrate an annotation workflow. As used herein, annotation refers to the processing of stored data to add new data or supplement the data with existing data. Data to be annotated is referred to as raw data or a raw data set. Additions to the raw data are referred to as annotated data. A combination of raw data and annotated data is referred to as composite data.

In the pipeline (130), raw impression data (104) is received. The use of impression data is provided as an example, and other data types may be used. The embodiments place no limit on the underlying type of data processed herein. The raw impression data (104) can refer to data regarding the display of content in webpages (e.g., the time viewed, the owner of the content, etc.). Raw impression data (104) is generally amassed via log files that log the selection and display of content. In the illustrated embodiment, the raw impression data (104) can comprise a plurality of database columns and rows. In some embodiments, this data can be stored in Orc, Parquet, or other column-oriented data formats.

The raw impression data (104) is processed during an impression decorating stage (106). In the illustrated embodiment, the impression decorating stage (106) can comprise a Pig or Hive script or other similar data processing script. Generally, the impression decorating stage (106) performs one or more operations on the raw impression data (104). For example, the impression decorating stage (106) can add additional columns to the raw impression data or can alias column names.

The output of the impression decorating stage (106) is an impression annotation data set, also referred to as a decorated impression data set (108). As illustrated, the impression decorating stage (106) does not copy the raw impression data (104) to a new location. Instead, the raw impression data (104) is locally processed. That is, the impression decorating stage (106) can comprise a distributed algorithm that is run on the same device that is storing the raw impression data (104). In contrast, however, the decorated impression data (108) is written to disk after being created. In the illustrated embodiment, the decorated impression data set (108) comprises a set of columns capturing only the new data to decorate the raw impression data. The decorated impressions (108) and raw impressions (104) are accessed by pipeline (128) to annotate a clickstream further, as described herein.

Similar to the pipeline (130), pipeline (128) receives raw click data (110). In one embodiment, raw click data (110) can comprise data regarding user selection of digital content. For example, while raw impression data (104) can include rows for each time a piece of content is displayed on a web page, raw click data (110) can include rows for each time that content is selected by a user.

Similar to the impression decorating stage (106), the click decorating stage (112) adds one or more columns or fields to the raw data. As in stage (106), the click decorating stage (112) generates these additional columns for fields as a physically distinct file (114). Thus, the click decorating stage (112) does not modify or copy the raw click data (110) when generating the decorate click data (114).

In the illustrated embodiment, a join annotating stage (116) receives the raw click and impression data (110, 104) and the decorated clicks and impressions (114, 108). In some embodiments, the join annotating stage (116) copies the impression data (104, 108) to form the annotated clicks data set (118). In one embodiment, the join annotating stage (116) filters the impression data (104, 108) to identify only that impression data relevant to the click data (110, 114) and uses the filtered data as an annotation set to generate the annotated clicks.

In the illustrated embodiment, a normalization stage (120) is configured to receive the combined impression composite data set (104, 108) and the composite annotated clicks data set (118). In one embodiment, the normalization stage (120) is configured to add a further annotation to the composite data sets. For example, the normalization stage may perform grouping or sorting of the data as well as synthesized columns based on aggregations of the underlying data. As a result, the normalization stage (20) generates a normalized annotation data set (122). As illustrated, only the annotations (124) are written to disk during this stage, and the remaining data (104, 108, 110, 114) is not copied to a new location on disk.

Finally, the normalized annotation data set (112) is provided to downstream processing applications for analysis, further processing, and storage, as required by such applications. As indicated in the figure via dotted lines, data sets in the pipelines are not copied during the annotation phases. The result is that the normalized data (122) can include the annotation results of the pipeline (128, 130) stages, the normalization annotations, and the raw underlying data without incurring the computationally expensive copying costs required by existing solutions. Specific methods for avoiding this unnecessary copying are described in more detail herein in the context of a distributed computing platform such as Hadoop.

Figure 2A:
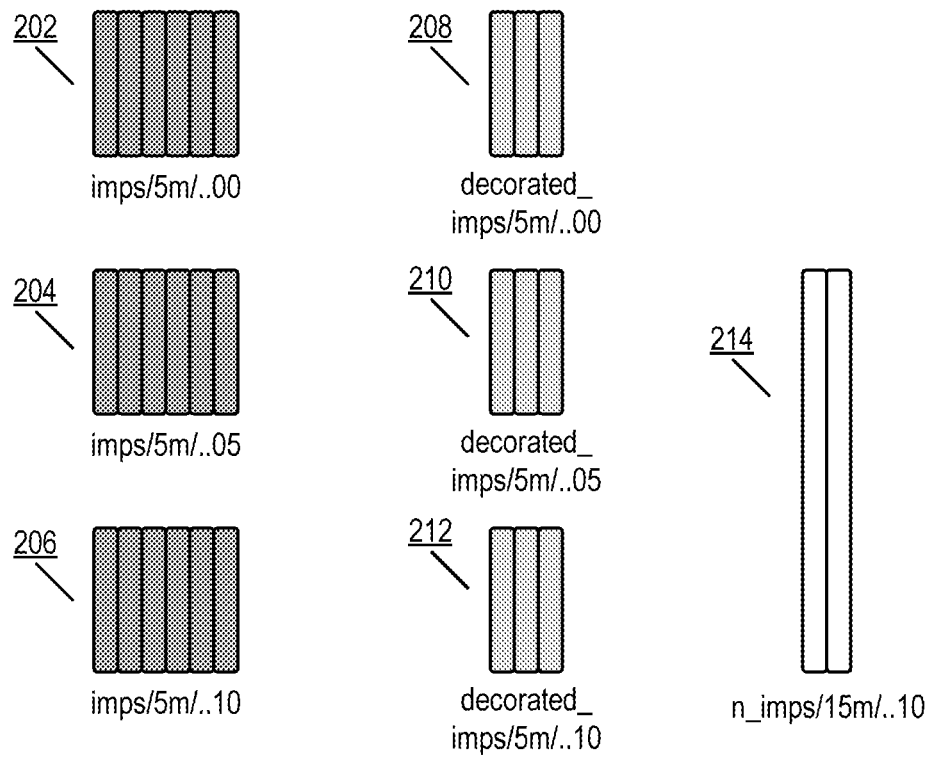
FIG. 2A illustrates the physical storage layout of a distributed processing system according to some embodiments of the disclosure.

FIG. 2A illustrates the physical storage layout of a distributed processing system according to some embodiments of the disclosure.

In the illustrated embodiment, a set of rows and columns representing raw data is stored at three locations (202, 204, 206). As one example, these locations (202, 204, 206) can comprise three physically distinct storage devices storing a portion of the entire data set represented by the portions. In one embodiment, each location (202, 204, 206) comprises a file, and each file can be stored on the same or different computing devices.

In addition to raw data (202, 204, 206), decoration data is stored in three locations (208, 210, 212). Similar to locations (202, 204, 206), the decoration data is stored in individual files stored on the same or different computing devices. Notably, the decoration data is stored in files separate from the raw data.

Finally, the second level of annotation data is stored at location (214). Again, this location comprises a separate file from the previous locations (202 through 212). Thus, each set of annotations is stored in physically separate files or other structures. Further, there is no limitation on the mapping of the number of files between raw data and annotations. As illustrated, raw data is stored in three files at three locations (202, 204, 206).

Similarly, second level annotation data is also stored in three files at three locations (208, 210, 212). However, the final layer of annotation data is stored in a single file at one location (214). To facilitate this, each annotation structure includes a row identifier that is described in more detail in U.S. patent application Ser. No. 16/727,060.

Figure 2B:
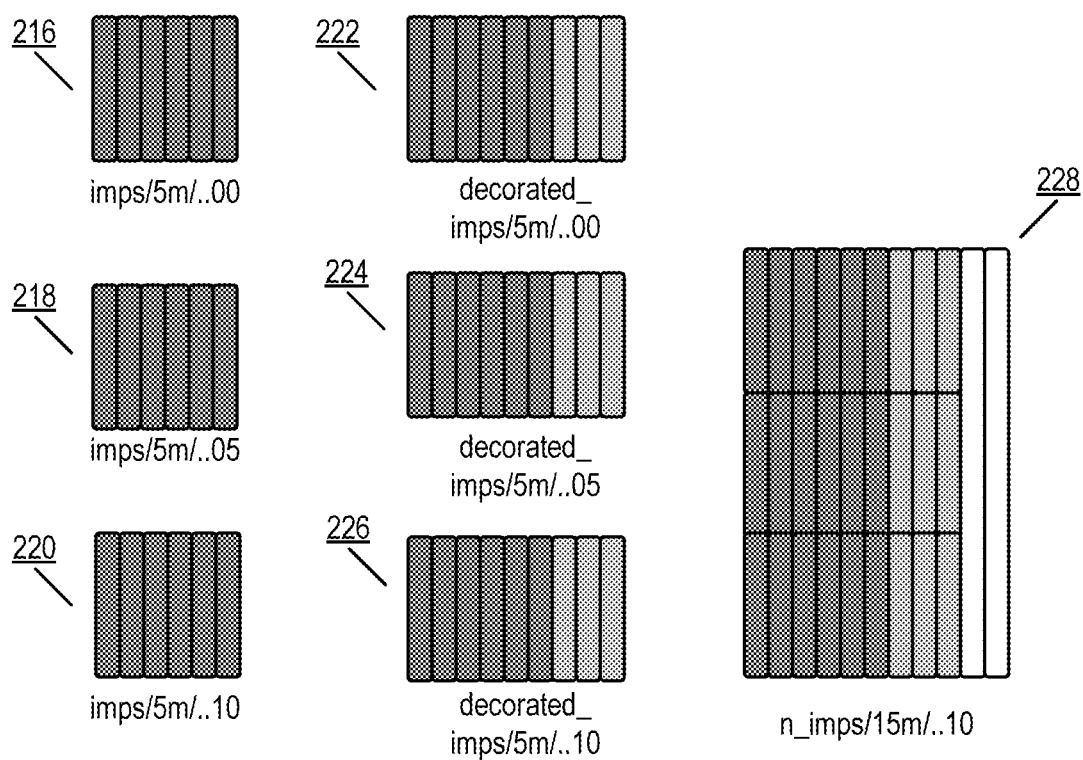
FIG. 2B illustrates the logical storage layout of a distributed processing system according to some embodiments of the disclosure.

FIG. 2B illustrates the logical storage layout of a distributed processing system according to some embodiments of the disclosure.

The illustrate storage layout comprises a logical view of the same data depicted physically in FIG. 2A. The illustrated view represents the view of data presented to downstream applications accessing the annotation data sets. In the illustrated embodiment, raw data sets are stored at first locations (216, 218, 220), first annotations are stored at second locations (222, 224, 226), and a third annotation is stored at a third location (228). When accessing the first annotations (222, 224, 226), a downstream processing algorithm accesses both the annotations (e.g., 208) and the raw data (e.g., 202) when accessing the second location (222). Further, when accessing the third location (228), the entire annotation data set appears as a single logical data set while comprising separate physical files.

Figure 3A:
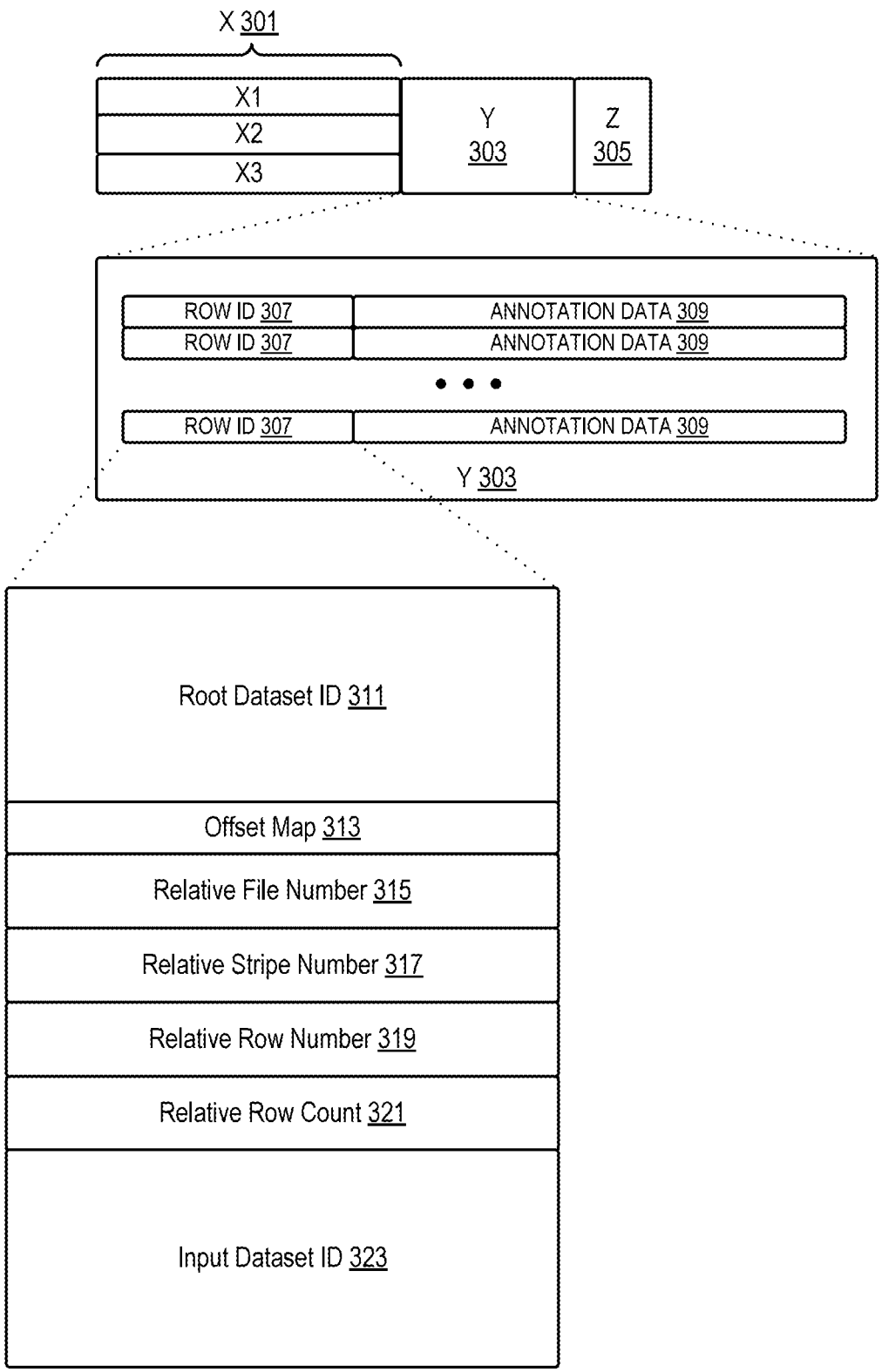
FIG. 3A is a diagram of a dataset according to some embodiments of the disclosure.

FIG. 3A is a diagram of a dataset according to some embodiments of the disclosure.

In the illustrated embodiment, a root dataset X (301) is illustrated. As used herein, a root dataset refers to a source of data to be annotated. For example, clickstream data captured during the operation of a web server may comprise a root dataset. In general, a root dataset does not include annotation data.

In some embodiments, the root dataset may comprise a set of root datasets. For example, a root dataset may comprise a clickstream dataset spanning fifteen minutes. This root dataset may be generated based on three five-minute root datasets. Thus, returning to FIG. 3, dataset X may comprise a combination of root datasets X1, X2, and X3. These root datasets (X1, X2, X3) all share the same (or similar) schema but may vary based on a given key (e.g., timestamp). As will be discussed, in this scenario, the root datasets (X1, X2, X3) may be stored in separate files, and thus any future annotations must be aligned to these individual files. However, for the sake of brevity, the root dataset (301) will be described as a single dataset.

As illustrated, annotation datasets Y and Z (303, 305) are depicted as extensions of the root dataset. As described above, these datasets Y and Z (303, 305) may be stored separately from the root dataset X (301) and may include additional columns to annotate the root dataset X (301). In the illustrated embodiment, dataset Y (303) is exploded to show the detail of such an annotation dataset.

Dataset Y (303) comprises a set of fields. Each field includes annotation data (309) and an annotated row identifier (ID) (307) (also referred to as a "row ID"). The fields may be ordered or unordered. In the illustrated embodiment, the annotation data (309) can comprise any data to annotate the rows of the root dataset X (301), and no limitation is placed on the type of annotation data (309).

The row ID (307) comprises a data structure that allows for the reconstruction of the datasets (301, 303, 305) at a later date. As described above, the system may not guarantee that the data stored in datasets (301, 303, 305) is returned in order. Further, since datasets (301, 303, 305) are stored separately and may be segmented differently, there is no mechanism to align the datasets (301, 303, 305) using auto-incrementing keys or similar techniques employed by, for example, relational databases.

The annotated row ID (307) includes a plurality of fields. Each row of the annotated dataset (e.g., 303) includes a row ID generated during the creation of the row.

In the illustrated embodiment, the row ID (307) includes a root dataset ID field (311). In the illustrated embodiment, this field (311) identifies the root dataset that the annotation data is aligned to. In the illustrated embodiment, this dataset comprises root dataset X. In some embodiments, as discussed, the field (311) may refer to a subset of the root dataset (e.g., X1, X2, or X3). In some embodiments, the field (311) comprises a 64-bit value. In some embodiments, the field (311) is generated by hashing the filename of the root dataset to generate a first hash and hashing the timestamp of when the root dataset was created to generate a second hash. These two hashes are then concatenated to form the root dataset ID. In some embodiments, the first hash comprises a hash of the UNIX epoch time. In alternative embodiments, the first hash comprises a bit-shifted, 32-bit field generated based on the UNIX epoch time (e.g., unixtime <<32). In some embodiments, the second hash comprises a 32-bit hash of the filepath of the root dataset. In this manner, the root dataset ID values are sortable based on the creation timestamp followed by the file path. In some embodiments, a global lookup table may be employed that maps root dataset IDs to integer values, thus shortening the field (311), which can then only include a single-digit lookup key.

In the illustrated embodiment, the row ID (307) includes an offset map field (313). In some embodiments, the offset map field (313) comprises a 1-byte value. In the illustrated embodiment, the offset map field (313) comprises a set of bit patterns that describe the length of the following three fields (315, 317, 319). In one embodiment, the offset map field (313) can include multiple bit patterns. For example, bits 0 and 1 of the offset map field (313) may indicate the length of a first field (315), bits 2 and 3 may indicate the length of the second field (317), and bits 4 and 5 may indicate the length of the third field (319). In this example, bits 6 and 7 may be reserved. In one embodiment, the values in the 2-bit patterns may be mapped to specific lengths. For example, the value 0b00 may indicate a 1-byte length, the value 0b01 may indicate a 2-byte (short) length, the value 0b10 may indicate a 4-byte (int) length, and the value 0b11 may indicate an 8-byte (long) length. As one example, the following bit pattern indicates that field (315) is two bytes, field (317) is eight bytes, and field (319) is one byte: 01110000. In some embodiments, the offset map field (313) may only comprise enough bits to represent the lengths of the three fields (315, 317, 319). Thus, the offset map field (313) may only comprise a six-bit field. In an alternative embodiment, the offset map field (313) may further include a 2-bit split strategy field. This split strategy field may comprise a field indicating the method used to split the root dataset for annotation. Values may include splitting a dataset based on file boundaries or stripe boundaries. In one embodiment, the split strategy field may be placed at the end of the offset map field (313). In other embodiments, the split strategy field may be placed at the beginning of the offset map field (313), as illustrated in the example provided herein. The specific placement of the split strategy field should not be construed as limiting the disclosed embodiments and other positions may be utilized.

The following four fields (315, 317, 319, 321) comprise variable length fields indicating encoded relative file numbers, stripe numbers, and row numbers, respectively. These fields are used to align a given row to a root dataset, as described in more detail herein.

In the illustrated embodiment, the relative file number field (315) comprises a field indicating the file from which the record originates. This field (315) is used by a partitioner to hash records from a single file into a single output file. The relative file number is an integer value enumerating the input files within a single dataset; thus, it is relative to the dataset component of the row ID. The relative file number field (315) is generated from an ordered traversal of the location path where the root dataset is located. In the illustrated example, this would be a file number relative to the originating dataset X (301) from which the file or stripe alignment is computed.

The relative stripe number (317) comprises the number of the stripe in which a record will be read. This field (317) is used by a partitioner to hash records from a single stripe into a single output file and stripe chunks. In some embodiments, the field (317) represents the stripe number relative to the file the stripe is located in. In the illustrated embodiment, this would be the stripe number in the file from root dataset X (301). In some embodiments, the stripe number is set to zero if file-based partitioning is used. Otherwise, the relative stripe number represents the nth stripe in the relative file number from which the row originates.

The relative row number field (319) is relative to a file or stripe, depending on the strategy used. Additionally, the row ID (307) includes a relative row count (321). In one embodiment, the relative row count (321) represents the total number of rows in a given file or stripe. In the illustrated embodiment, the relative row count (321) is the same width as the relative row number (319). The relative row number (319) may be listed last since it is not needed for sorting.

In the illustrated embodiment, each field in the row ID (307) is encoded in Big Endian order. In some embodiments, all integral values should be zero-padded or space-padded.

Finally, the row ID (307) includes an input dataset ID (323). In the illustrated embodiment, the input dataset ID (323) is generated in the same manner the root dataset ID (311) is generated (i.e., by concatenating hashes of the filename and creation timestamp). However, the input dataset ID (323) refers to the dataset containing the associated data. Thus, in the illustrated example, input dataset ID (323) would refer to dataset Y (303).

The following example illustrates the above format. In this example, a dataset has ten files, ten splits per file, and 1000 rows per split. In the illustrated embodiment, a stripe strategy is used (aligning based on stripes and not files). In this example, the first eight bytes are fixed and represent the root dataset ID. The next (ninth) byte may be encoded as 0b01000001 and corresponds to the offset map (313). The first two bits ("01") indicate the stripe split strategy. The next two bits ("00") indicates that files can be represented using one byte. The next two bits ("00") indicate that stripes may be stored as a byte. The last two bits ("01") indicate that a row number and row count can be encoded as a short since the number of rows (1000) is less than greater than one byte. Thus, the next four fields (315, 317, 319, 321) will require one byte, one byte, two bytes, and two bytes, respectively.

Alternatively, if the split strategy bits are aligned at the end of the offset map field (313), the value of the field (313) would be 0b00000101 (the foregoing description of each set of bits applies equally to this embodiment). Finally, the input dataset ID (323) is fixed at eight bytes. Thus, the total length of the row ID is 23 bytes. Thus, the format described above saves nine bytes of storage space for each row as compared to standard 32-bit identifier values.

The above format also enables the sorting of rows based not on an auto-incrementing counter but based on the partitioning strategy. Because the first eight bytes are fixed and represent a dataset, this implies that all row IDs for a given dataset will be grouped together by the sorting algorithm due to this being prefixed. All of the rows for a given dataset will logically share the same value of the encoding byte because this is a constant based upon dataset level metadata. All values sharing the same encoding byte value will be the same length and right padded within that length, making all rows within a given dataset comparable by row ID in their natural order. Thus, the row ID is sortable.

Figure 3B:
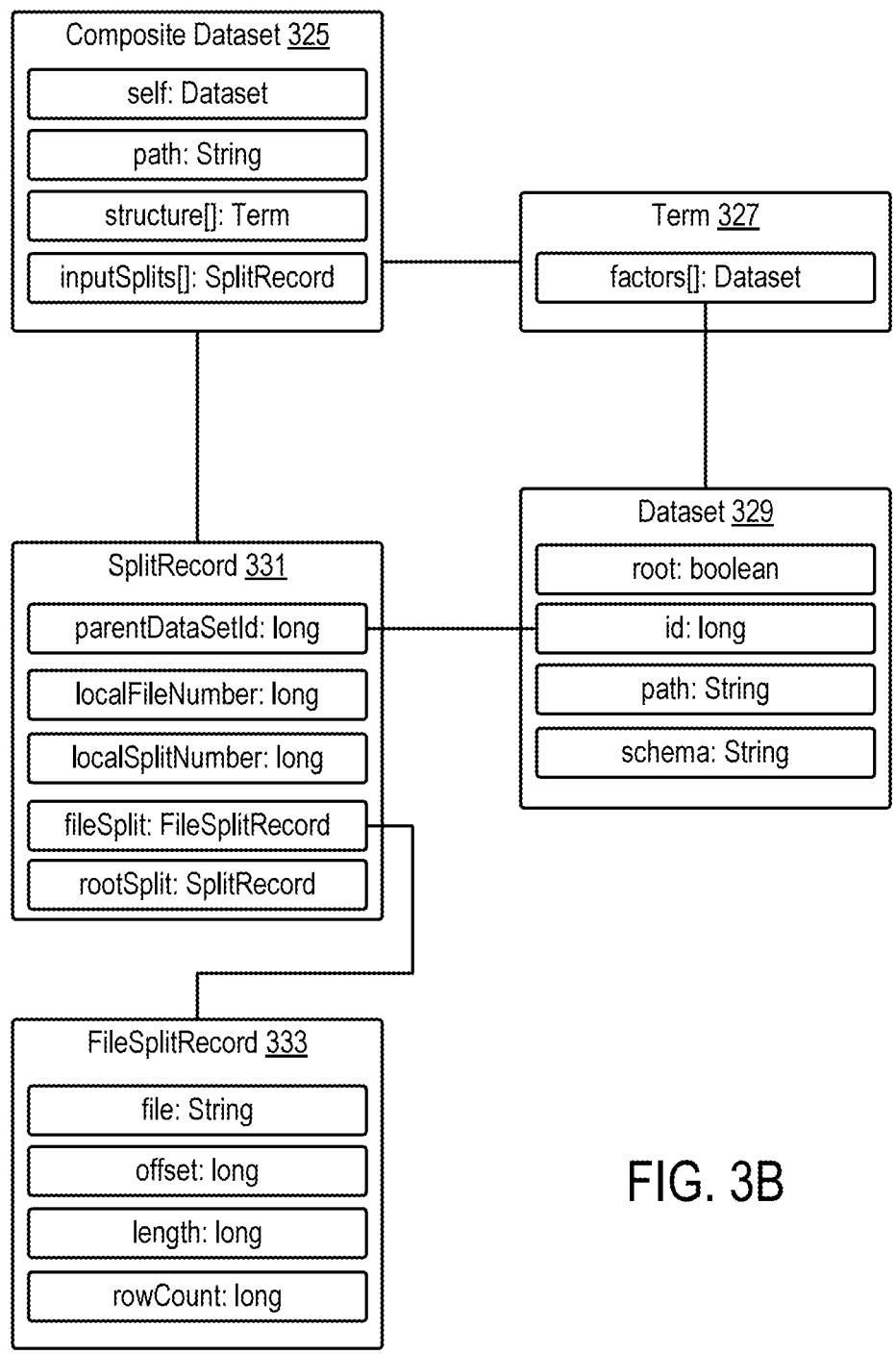
FIG. 3B is a class diagram illustrating a metadata object for a composite dataset according to some embodiments of the disclosure.

FIG. 3B is a class diagram illustrating a metadata object for a composite dataset according to some embodiments of the disclosure.

In the illustrated embodiment, a composite dataset is represented by an object (325). This object (325) is then serialized to generate a metadata file for a given composite dataset. In some embodiments, the object (325) can be serialized into a binary format. In other embodiments, the object (325) can be serialized into a text format (e.g., JavaScript Object Notation (JSON)).

The composite data set object (325) includes a "self" property that comprises a dataset object (discussed in connection with 325). This "self" property represents inter alia the structure of the actual annotation data and storage mechanics. In some embodiments, the properties in a dataset object (e.g., 325) may be flattened into top-level properties of the composite dataset object (325).

The composite data set object (325) additionally includes a path property. The path property represents the location of the given composite dataset on disk and may comprise a relative or, more commonly, an absolute path. In addition to the self and path properties, the composite dataset object (325) may further include various properties such as an identifier that uniquely identifies the dataset in the system. The composite data set object (325) may also include a file count property that represents the number of files constituting the composite dataset. The composite data set object (325) may include a property identifying the number of splits per file and a property identifying the number of rows per split.

The composite data set object (325) additionally includes an inputSplits property. This property comprises an array of SplitRecord objects (described in connection with element 327). This array of SplitRecord objects describes the splits associated with each dataset.

As illustrated, the composite data set object (325) also includes a structure property that represents the flattened, algebraic representation of the composite dataset, described above. The structure property comprises a set of terms (327) that define the structure of the composite dataset. Each term is a summand in the algebraic representation and contains a dataset element for each factor (described in connection with element 325). In the example depicted in FIG. 3A, the structure property would include three terms: $X1 \cdot Y \cdot Z$, $X2 \cdot Y \cdot Z$, and $X3 \cdot Y \cdot Z$ In the illustrated embodiment, a term (327) includes a factors property. The factors property comprises an array of dataset objects (e.g., 325). In the example, depicted in FIG. 3A the term X1·Y·Z would include three factors of X1, Y, and Z.

Each dataset is represented by a dataset object (329). A dataset comprises a directory in the grid storage of the distributing computing environment. In some embodiments, the dataset objects may be normalized such that only one unique copy of a dataset object is stored in the class. In the example in FIG. 3A, only five dataset objects would be instantiated: X1, X2, X3, Y, and Z. Each dataset object (329) has a root property, which indicates whether the dataset is a root or annotation dataset. If true, the dataset comprises the first factor in a term and is used to identify the starting point of the summands. The dataset object (329) additionally includes an identifier (id) property that comprises a unique identifier for the dataset and a path property that identifies the location (absolute or relative) of the dataset on disk. The id is created as a hash using the absolute path to the data and the current time.

The dataset object (329) additionally includes a schema property. In some embodiments, the schema property will include the column names and associated data types for the dataset. In alternative embodiments, the schema property includes only the column names for the dataset. In some embodiments, the schema property comprises a JSON string. In some embodiments, the schema may be in the Avro data format.

As discussed above, the composite dataset object (325) includes a splits property that includes one or more SplitRecord objects. Each SplitRecord object includes details regarding the splits of a given dataset, as described in more detail herein.

A SplitRecord object (331) identifies the details of splits within a given dataset. In some embodiments, a split refers to a file-based split object or a stripe-based split object and generally includes a subset of the total rows of a given dataset. As illustrated, a SplitRecord object (331) includes a parentDataSetId property that identifies the dataset the SplitRecord is associated with. The SplitRecord object (331) includes a fileSplit property that comprises a FileSplitRecord object (333). The fileSplit property represents details generated when implementing a file-based split operation. Alternatively, the fileSplit property may comprise a stripe split property. As illustrated, the FileSplitRecord object (333) includes a file property (identifying the location of the file), an offset property (identifying the offset of the contents of the file in the overall data), a length property (identifying the length of the data in the file), and a rowCount property (identifying the number of rows in the file).

The SplitRecord object (331) additionally includes localFileNumber and localSplitNumber properties. These properties represent the corresponding file number and split number, respectively, for a given SplitRecord. In some embodiments, the SplitRecord object (331) may include further properties describing the details of a given file split or stripe split. In some embodiments, this parameter can refer to an object, including the location of the file/stripe, offset, length, row count, and other details regarding the format of the underlying storage.

Finally, the SplitRecord object (331) includes a rootSplit property that comprises a FileSplitRecord object (333). The rootSplit property represents a split record for the root dataset to which this split is aligned. For a root dataset, this property is set to null.

Figure 3C:
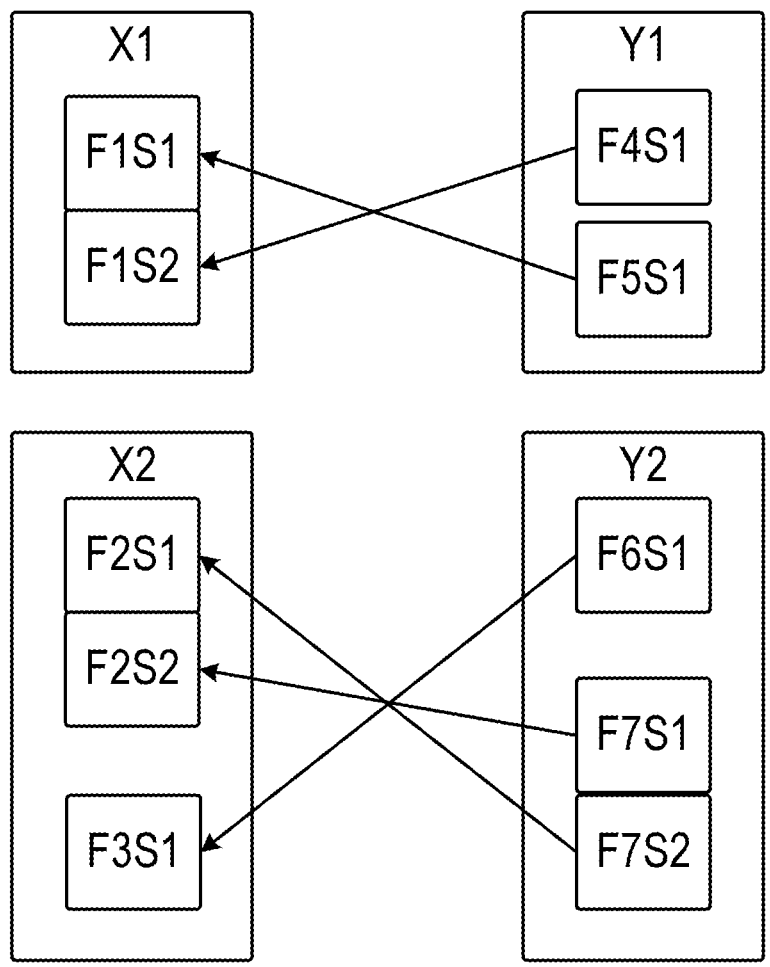
FIG. 3C is a diagram illustrating a file and split mapping according to some embodiments of the disclosure.

FIG. 3C is a diagram illustrating a file and split mapping according to some embodiments of the disclosure.

In the illustrated embodiment, X1 and X2 comprise two datasets, and Y1 and Y2 comprise two annotation datasets. In some embodiments, X1 and X2 comprise root datasets.

In the illustrated embodiment, the dataset X1 is stored on disk in a single file (F1). This file (F1) contains two splits (S1 and S2). As one example, the splits (S1 and S2) can comprise chunks of data to write to a grid storage device. Thus, a single file may have an arbitrary number of splits based on memory usage or file size, as described above. Further, these splits (S1 and S2) may be stored in different locations. Similar to X1, dataset X2 comprises two files (F2 and F3). File (F2) includes two splits (S1 and S2) and the file (F3) includes a single split (S1). These files and splits may be generated during the writing of the datasets X1 and X2 as described above, and no limitation is placed on this creation.

As illustrated, datasets Y1 and Y2 comprise annotation data. Generally, each row in the datasets Y1 and Y2 will map to a row in the datasets X1 and X2. As illustrated, dataset Y1 includes two files (F4 and F5), each file storing one split. Dataset Y2 contains two files (F6 and F7) with one file (F6) having a single split and the second file (F7) having two splits. Arrows between files and splits illustrate the mapping between chunks of data in the annotation datasets (Y1, Y2) and the datasets (X1, X2). For example, file/split (F4S1) maps to file/split (F1S2).

As illustrated, when annotating the datasets (X1, X2), there is generally no guarantee that the number of files or splits mirror the files or splits of the original datasets (X1, X2). In the illustrated embodiment, partial metadata is generated during the annotation phase used to generate Y1 and Y2. Like the creation of a dataset (X1, X2), a given writer is assigned to write a given file. However, during annotation the system must also properly align data with the corresponding dataset (X1, X2). As an example, a reader may process dataset X1 by reading F1S1 followed by F1S2. However, when reading dataset Y1 in the same manner, the reader would read F4S1 first and F5S1 second. This ordering reverses the direction of the splits and results in misaligned data. Thus, while the reading of X1 starts at row 0 (F1S1), the reading of Y1 begins at row n, where n comprises the first row of F1S2. Furthermore, the number of files in the datasets Y1 and Y2 is not equal to the number of files in datasets X1 and X2, thus the system must further synchronize the differing number of files to ensure that rows are aligned when combining the datasets.

As will be described in detail below, in some embodiments, the datasets illustrated in FIG. 3C represent the resulting data alignment after a JOIN operation. Specifically, the joining of X1+X2 with Y1+Y2. In the embodiments that follow, it is assumed that the ordering of splits and files in Y1+Y2 are not aligned to the files and splits of X1+X2, as indicated by the arrows showing the mapping. Further, it is assumed that individual rows within the splits are unordered. Thus, since each dataset (X1, X2, Y1, Y2) is stored independently, the data resulting from the JOIN is unusable given the misalignment. The following embodiments describe techniques for performing a reordering of the rows that results in a near linear complexity as compared to the n·log(n) complexity of combining and sorting rows.

Figure 4A:
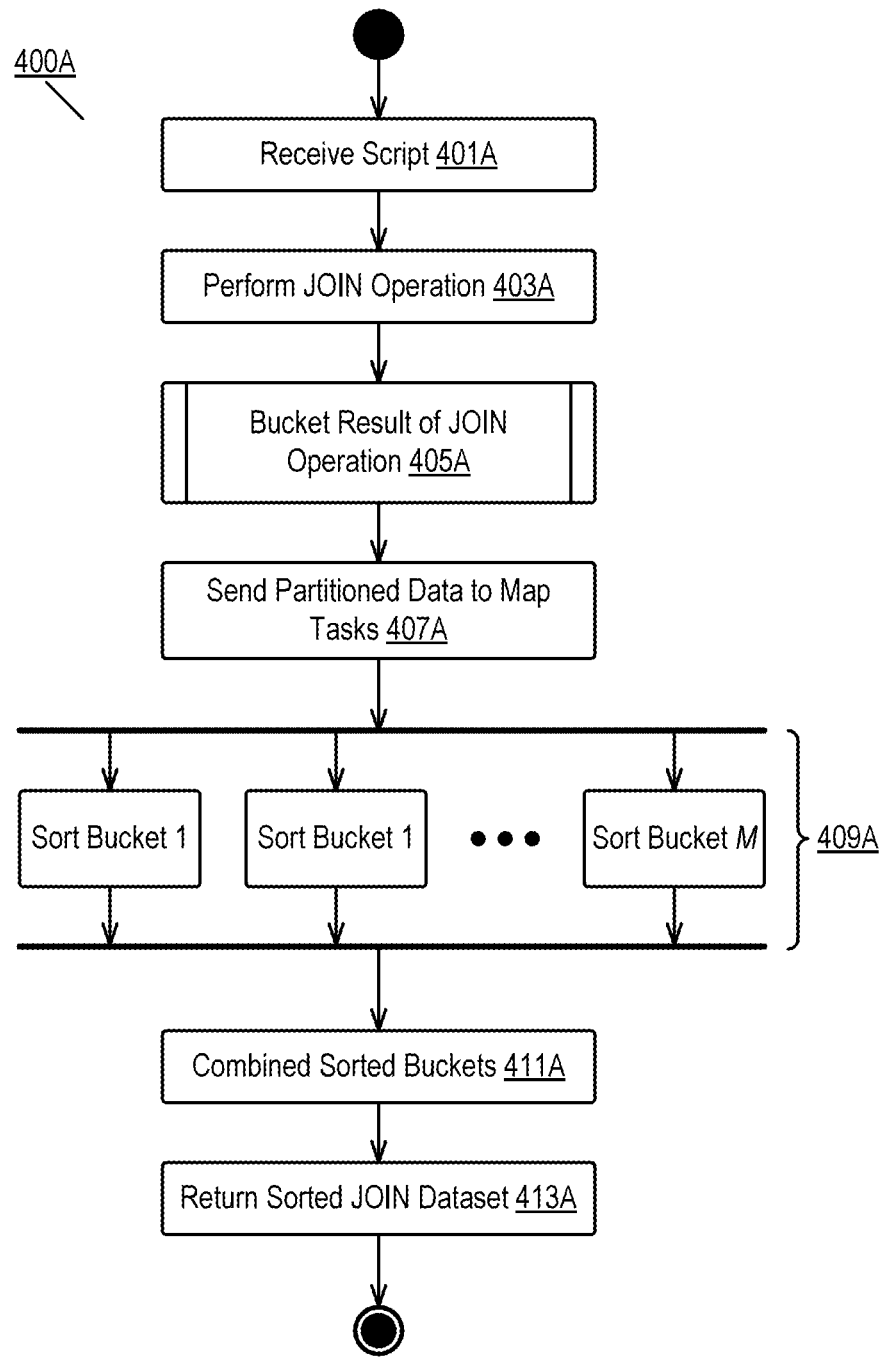
FIG. 4A is a flow diagram illustrating a method for sorting unordered rows of an unordered dataset according to some embodiments of the disclosure.

FIG. 4A is a flow diagram illustrating a method for sorting unordered rows of an unordered dataset according to some embodiments of the disclosure.

In step 401a, the method (400a) receives a script. In the illustrated embodiment, the script comprises a Pig, Hive, or other script for processing distributed data. In the illustrated embodiment, the script includes a plurality of commands accessing, manipulating, and storing datasets. In the illustrated embodiment, the script includes at least one JOIN command, the JOIN command joining at least two datasets. In some embodiments, these two datasets include a root dataset and an annotation dataset.

In step 403a, the method (400a) performs a JOIN operation present in the script. In some embodiments, the JOIN operation combines the rows of two datasets after the annotation dataset has been properly ordered. The method (400a) then returns the dataset as a joined dataset.

Returning to FIG. 3C, a first dataset X1 includes a single file with two splits, while the corresponding annotation dataset Y1 contains two files with one split each. Further, the files of dataset Y1 are reversed when compared to the order of dataset X1. In a standard JOIN, the operation may potentially result in the joining, for example, of F1S1 with F4S1, resulting in misaligned and corrupted data. Thus, prior to joining the method (400c) must properly align the annotation data set prior to executing a JOIN operation. Alternatively, in some embodiments, the method (400c) executes the JOIN and then reorders the annotation data after the JOIN.

In step 405a, the method (400a) buckets the result of the JOIN operation. In one embodiment, the JOIN operation returns a combination of a root dataset and columns from an annotation dataset. As described above, the annotation dataset may be misaligned with the root dataset.

As described above, each row in the annotation data set includes a row identifier. Thus, the resulting JOIN dataset may be of the form:

| ROOT DATASET FIELDS | ANNOTATION ROW IDENTIFIER | ANNOTATION DATASET FIELDS |
|---|---|---|
| ... | F4S1 | ... |
| ... | F5S1 | ... |
| ... | F6S1 | ... |
| ... | F7S1 | ... |
| ... | F7S2 | ... |

The illustrated annotation row identifiers are illustrated as integers for the sake of simplicity and the actual format of the row identifier is described in FIG. 3A. In the illustrated table, it is presumed that the root dataset fields are returned in the order illustrated in datasets X1 and X2 in FIG. 3C. Further, there is no guarantee that a single split will be returned in a contiguous block. That is, rows of splits can be interleaved in the resulting dataset.

Thus, the resulting JOIN dataset improperly aligns the data. However, since the annotation dataset was created with a row identifier that encapsulates the mapping (along with a metadata file generated for the entire dataset), the method (400a) uses these two pieces of information to segment the dataset into buckets that are independently sortable.

The method (400a) employs a bucketing procedure to perform an initial grouping of rows based on their proper alignment with a root split. Details of this procedure are described in the description of FIG. 4B and are not repeated herein. Generally, the number of buckets will be equal to or less than the number of root splits in the root dataset.

In step 407a, once the method (400a) buckets the rows into root split buckets, the method (400a) sends the partitioned row data to a plurality of map tasks. In the illustrated embodiment, M map tasks are illustrated. In one embodiment, the method (400a) may optimize the data before sending the data to each map task. In one embodiment, this optimizing includes truncating the row identifier to include only the row number, which reduces the total size of the data.

In step 409a, the method (400a) sorts each bucket of rows in an independent process running on a distributed node. As discussed above, the number of map tasks may be configurable but may be set to less than the total number of root splits. In general, the more map tasks allocated, the faster the processing speed.

In the illustrated embodiment, the method (400a) sorts the buckets using any sorting algorithm. In the illustrated embodiment, the method (400a) sorts the buckets based on the row identifier. Specifically, in some embodiments, the method (400a) sorts the rows in a bucket based on a relative row number in the row identifier. Since all rows in a bucket are within a single split, the relative row number can be used as a sort key, improving performance when compared to sorting on an arbitrary length string.

In general, the complexity of the foregoing procedure is:

$$O\left(M \cdot \left(\frac{N}{M} \cdot \log\left(\frac{N}{M}\right)\right)\right) = O\left(N \cdot \log\left(\frac{N}{M}\right)\right)$$

where M is the number of nodes sorting buckets and N is the total number of rows in the dataset.

The above complexity is derived from the fact that M tasks are used to sort the entire dataset and each task receives N/M rows. The individual complexity of a given sort task is n·log(n), thus resulting in a $$\frac{N}{M}\log\left(\frac{N}{M}\right)$$

complexity multiplied by the same number of tasks. Since the value of M is adjustable (limited only by the number of root splits), the complexity of the depicted procedure is close to linear, a significant improvement over simply sorting row identifiers. Further, if improved performance is needed, the system can increase the number of splits in the data, thus increasing the value of M.

In step 411a, the method (400a) receives the sorted buckets from the map tasks and combines the sorted buckets. In the illustrated embodiment, after executing step 409a, the method (400a) obtains a set of files and splits containing ordered row data. In one embodiment, the method (400a) analyzes the metadata file for the annotation dataset to map the returned annotation files and splits back to the root dataset. Thus, in this step 411a, the method (400a) performs a final reordering of the splits/files based on the root dataset ordering.

In step 413a, the method (400a) returns the sorted JOIN dataset. In the illustrated embodiment, the end-user receives the JOIN dataset in response to a JOIN command. Thus, to the end-user, the foregoing operations are not visible to the user and yet the user receives the expected, ordered data in response to a traditional JOIN command.

Figure 4B:
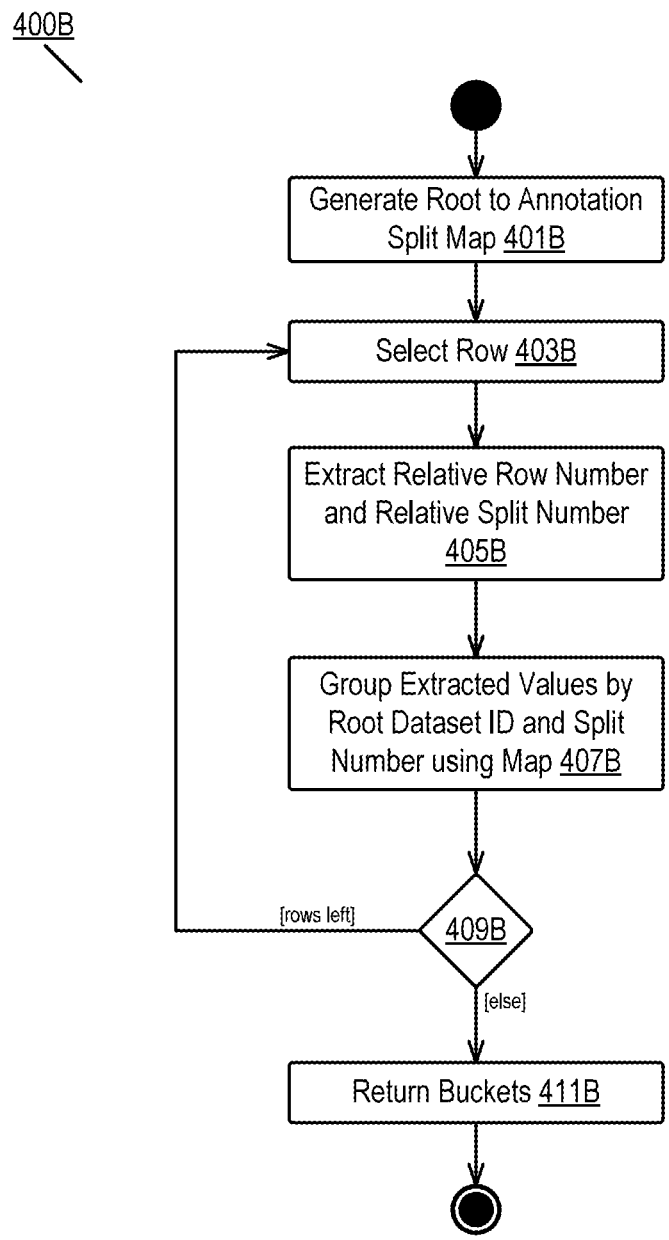
FIG. 4B is a flow diagram illustrating a method for grouping rows of an unordered dataset according to some embodiments.

FIG. 4B is a flow diagram illustrating a method for grouping rows of an unordered dataset according to some embodiments. In the illustrated embodiment, the method (400b) corresponds to the processing performed by step 405a in FIG. 4A.

In step 401b, the method (400b) generates a root to annotation split map. In the illustrated embodiment, when reading an annotation dataset, the method (400b) reads a metadata file associated with the annotation datafile. As depicted in FIG. 3B, this metadata file includes a listing of input split records. Each of these splits records describes a file and split in the annotation dataset. Additionally, each split record includes a reference to the corresponding root split. Thus, the metadata file stores an annotation split to root split mapping. As part of process 401*b*, the method (400*b*) inverts this mapping to obtain a root split to annotation split mapping.

In step 403*b*, the method (400*b*) selects a row from the unordered annotation dataset. As described in FIG. 4A, the rows selected in step 403*b* comprise the annotation dataset in any order.

In step 405*b*, the method (400*b*) extracts the relative row number and relative split number from a row. As illustrated in FIG. 3A, these values can be extracted from the row identifier of the selected row. In some embodiments, a short user-defined function in the scripting language (e.g., Pig) is implemented to perform the extraction. In the illustrated embodiment, the relative split number comprises either the relative file and/or stripe number depending on the split strategy used. As described in FIG. 3A, these values are relative to the root dataset.

In step 407*b*, the method (400*b*) groups the row using a root dataset identifier and a relative split (file or stripe) number using the map generated in step 401*b*. As illustrated in FIG. 3A, the row identifier includes the root dataset identifier as well as the relative split number. Since the mapping comprises a map of root splits to annotated splits, this mapping is an O(1) operation and returns the annotated split number. This annotated split number is used to split the rows based on split boundaries.

In step 409*b*, the method (400*b*) determines if any rows remain in the rows of the annotation dataset. If so, the method (400*b*) continues to execute steps 403*b*, 405*b*, and 407*b* for the remaining rows. If not, the method (400*b*) proceeds to step 411*b* where the buckets are returned to the calling process described in FIG. 4A for transmittal to individual map tasks.

Figure 6A:
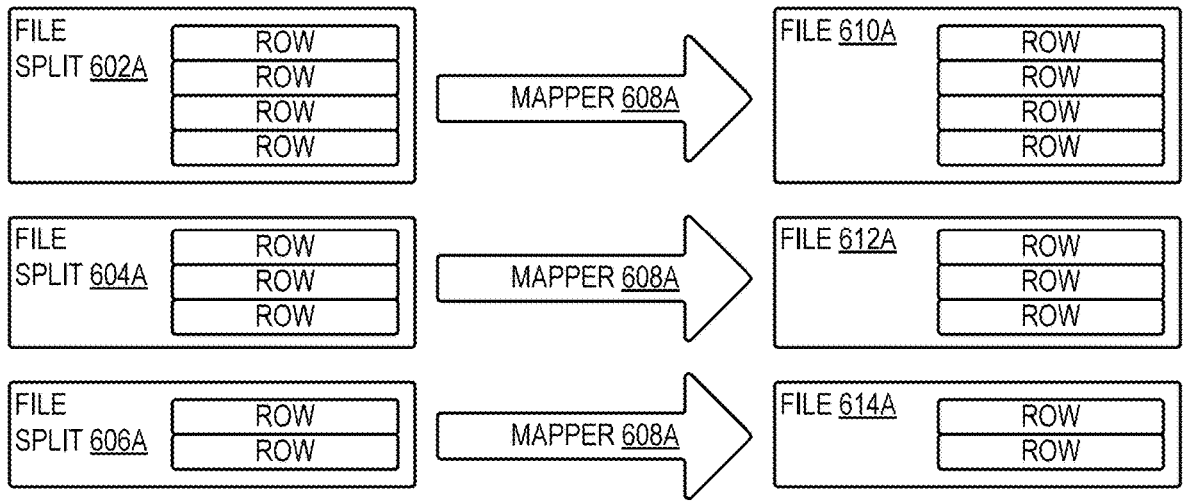
FIG. 6A is a diagram illustrating a mapping process performed in a distributed computing environment using a file-based alignment scheme according to some embodiments of the disclosure.

FIG. 6A is a diagram illustrating a mapping process performed in a distributed computing environment using a file-based alignment scheme according to some embodiments of the disclosure.

In one embodiment, the illustrated dataset comprises a root dataset, although composite datasets may also be read. Multiple physical files may be read when reading a dataset. As illustrated in FIG. 6A, a dataset is split based on file boundaries into three files (602*a*, 604*a*, 606*a*), each file containing a set of rows. In one embodiment, the system forces the distributed file system to split data based on file boundaries.

The system can generate an annotation dataset using a single mapper. As known in the art, mapper tasks are distributed to data nodes of a Hadoop system. The system causes the system to distribute the map task (608*a*) to each data node containing the files (602*a*, 604*a*, 606*a*). The map task (608*a*) is configured to operate on a single file. As described previously, the map task (608*a*) annotates the rows of a given file (602*a*, 604*a*, 606*a*) and generates annotation row identifiers for the resulting annotation dataset. In the illustrated embodiment, the writing is mapper only: no reduce phase is required to generate the output files (610*a*, 612*a*, 614*a*). In some embodiments, a reducer phase can be implemented if needed by the underlying ETL instructions. If a reducer phase (not illustrated) is included, a separate final partition reducer stage is needed.

The system generates annotation dataset metadata. In one embodiment, this may be performed by a reducer task. In one embodiment, the metadata describes the annotation dataset. The metadata may include structural metadata, split coordination metadata, and a schema. In some embodiments, the metadata for a given annotation set is stored in a file separate from the underlying data.

In general, the output annotation dataset is composed of horizontal and vertical unions of raw datasets. In some embodiments, each annotation dataset is assigned a unique identifier (e.g., a 64-bit identifier). Structural metadata provides the ID of the annotation dataset that the metadata describes as well as the ID's of the datasets from which the annotation dataset is constructed and how those sets are combined with one another. The split coordination metadata describes how the annotation data file is split. In the illustrated embodiment, the split coordination metadata includes a fixed-length array that enumerates all splits in the dataset. In the illustrated embodiment, elements of the array include a relative path name followed by a start and length that covers the entire file. In one embodiment, the schema metadata may comprise a list of columns added via the annotation dataset.

Further detail on metadata files for annotation datasets is provided in U.S. patent application Ser. No. 16/727,142.

The system writes the annotation dataset to disk. As illustrated, the output of the map task (608*a*) comprises files (610*a*, 612*a*, 614*a*), including rows representing the annotation data. Thus, as a final stage, the mappers (608*a*) write the annotation datasets to the files identified in the metadata file. Alternatively, if reducer stages are implemented, the reducer may write the files.

Figure 6B:
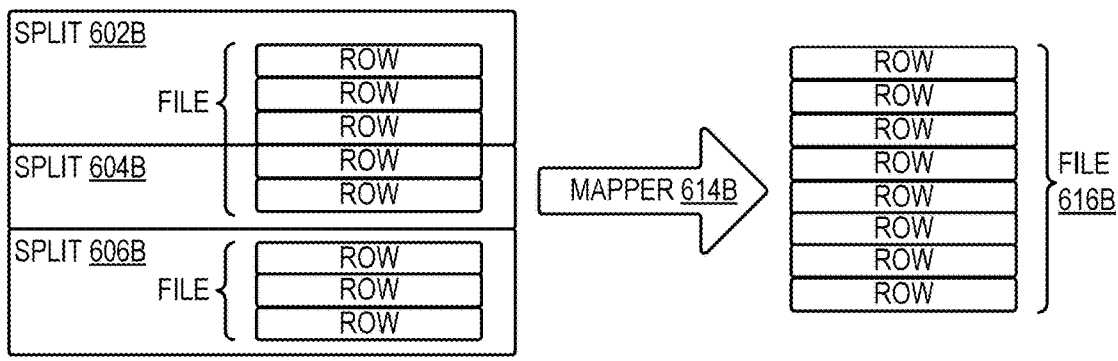
FIG. 6B is a diagram illustrating a mapping process performed in a distributed computing environment using a stripe-based alignment scheme according to some embodiments of the disclosure.
Figure 6B:
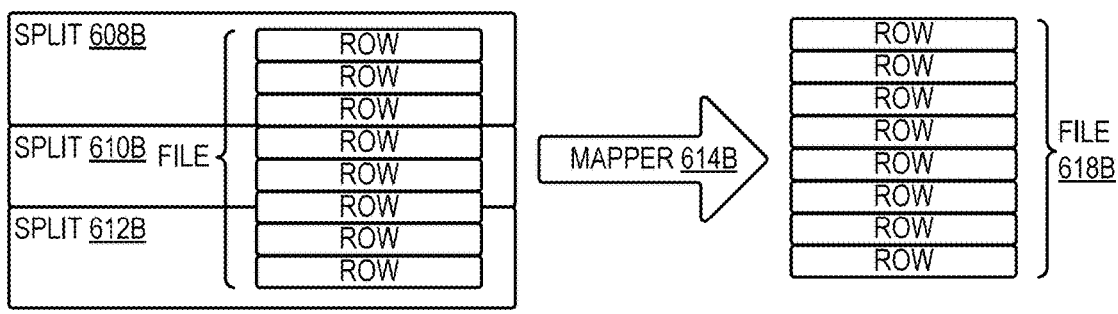

FIG. 6B is a diagram illustrating a mapping process performed in a distributed computing environment using a stripe-based alignment scheme according to some embodiments of the disclosure.

The system reads a dataset. In one embodiment, the dataset comprises a root dataset, although composite datasets may also be read. Multiple physical files may be read when reading a dataset. As illustrated in FIG. 6B, a dataset is split based on stripe boundaries into six splits (602*b*, 604*b*, 606*b*, 608*b*, 610*b*, 612*b*), each split containing a set of rows. Although described using stripes, RowGroups or other similar constructs may be used. As illustrated, a given file may span splits (e.g., 602*b*, 604*b*).

The system selects a set of stripes from a given dataset. In some embodiments, the system may select a preconfigured number of stripes based on system requirements (e.g., a preferred stripe length for output data). As illustrated in FIG. 6B, the resulting stripes may span multiple files. Thus, a stripe-based alignment mechanism enables a reduced number of data files for an annotation dataset since decisions are premised on stripes rather than files.

The system generates an annotation dataset using a single mapper. As known in the art, mapper tasks are distributed to data nodes of a Hadoop system. The system causes the system to distribute the map task (614*b*) to each data node containing the stripes (602*b*, 604*b*, 606*b*, 608*b*, 610*b*, 612*b*). The map task (614*b*) is configured to operate on a set of stripes in one or more splits. As described previously, the map task (614*b*) annotates the rows of a given split (602*b*, 604*b*, 606*b*, 608*b*, 610*b*, 612*b*) as well as generates annotation row identifiers for the resulting annotation dataset. In the illustrated embodiment, the writing is mapper only, but reducer phases may be added as described previously in connection with FIG. 6A.

The system generates annotation dataset metadata. In one embodiment, this may be performed by a reducer task. In one embodiment, the metadata describes the annotation dataset. The metadata may include structural metadata, split coordination metadata, and a schema, as described in the description of FIG. 6A. In contrast to the metadata generated in FIG. 6A, the split coordination metadata would include more entries containing file paths but would include smaller lengths and non-zero starting locations indicating stripe boundaries.

The system writes the annotation dataset to disk. As illustrated, the output of the map task (614b) comprises files (616b, 618b), including rows representing the annotation data. Thus, as a final stage, the mappers (614b) write the annotation datasets to the files identified in the metadata file. Alternatively, if reducer stages are implemented, the reducer may write the files.

Figure 5:
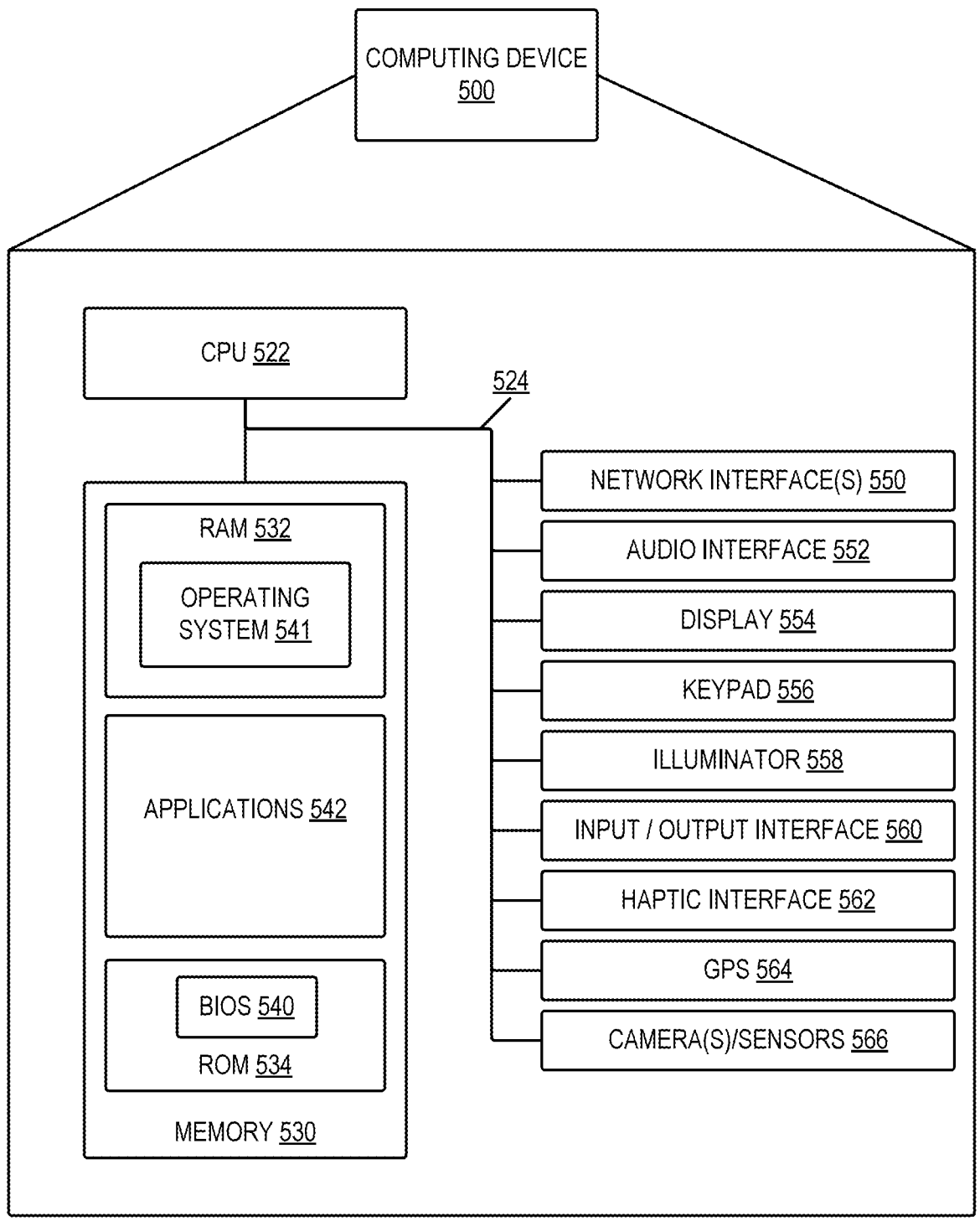
FIG. 5 is a schematic diagram illustrating a computing device showing an example embodiment of a client or server device that may be used within the present disclosure.

FIG. 5 is a schematic diagram illustrating a computing device showing an example embodiment of a client or server device that may be used within the present disclosure.

The computing device (500) may include more or fewer components than those shown in FIG. 5. For example, a server computing device may not include audio interfaces, displays, keypads, illuminators, haptic interfaces, GPS receivers, cameras, or sensors.

As shown in the figure, the device (500) includes a processing unit (CPU) (522) in communication with a mass memory (530) via a bus (524). Computing device (500) also includes one or more network interfaces (550), an audio interface (552), a display (554), a keypad (556), an illuminator (558), an input/output interface (560), a haptic interface (562), an optional global positioning systems (GPS) receiver (564) and a camera(s) or other optical, thermal, or electromagnetic sensors (566). Device (500) can include one camera/sensor (566), or a plurality of cameras/sensors (566), as understood by those of skill in the art. The positioning of the camera(s)/sensor(s) (566) on the device (500) can change per device (500) model, per device (500) capabilities, and the like, or some combination thereof.

The computing device (500) may optionally communicate with a base station (not shown), or directly with another computing device. Network interface (550) is sometimes known as a transceiver, transceiving device, or network interface card (NIC).

The audio interface (552) is arranged to produce and receive audio signals such as the sound of a human voice. For example, the audio interface (552) may be coupled to a speaker and microphone (not shown) to enable telecommunication with others and/or generate an audio acknowledgment for some action. Display (554) may be a liquid crystal display (LCD), gas plasma, light emitting diode (LED), or any other type of display used with a computing device. Display (554) may also include a touch-sensitive screen arranged to receive input from an object such as a stylus or a digit from a human hand.

Keypad (556) may comprise any input device arranged to receive input from a user. Illuminator (558) may provide a status indication and/or provide light.

The computing device (500) also comprises input/output interface (560) for communicating with external. Input/output interface (560) can utilize one or more communication technologies, such as USB, infrared, Bluetooth™, or the like. The haptic interface (562) is arranged to provide tactile feedback to a user of the client device.

Optional GPS transceiver (564) can determine the physical coordinates of the computing device (500) on the surface of the Earth, which typically outputs a location as latitude and longitude values. GPS transceiver (564) can also employ other geo-positioning mechanisms, including, but not limited to, triangulation, assisted GPS (AGPS), E-OTD, CI, SAI, ETA, BSS, or the like, to further determine the physical location of the computing device (500) on the surface of the Earth. In one embodiment, however, the computing device (500) may through other components, provide other information that may be employed to determine a physical location of the device, including, for example, a MAC address, Internet Protocol (IP) address, or the like.

Mass memory (530) includes a RAM (532), a ROM (534), and other storage means. Mass memory (530) illustrates another example of computer storage media for storage of information such as computer-readable instructions, data structures, program modules or other data. Mass memory (530) stores a basic input/output system ("BIOS") (540) for controlling the low-level operation of the computing device (500). The mass memory also stores an operating system (541) for controlling the operation of the computing device (500)

Applications (542) may include computer-executable instructions which, when executed by the computing device (500), perform any of the methods (or portions of the methods) described previously in the description of the preceding Figures. In some embodiments, the software and/or programs implementing the method embodiments can be read from hard disk drive (not illustrated) and temporarily stored in RAM (532) by CPU (522). CPU (522) may then read the software and/or data from RAM (532), process them, and store them to RAM (532) again.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

For the purposes of this disclosure, the term "user," "subscriber," "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    storing a root dataset, the root dataset storing a plurality of rows;
    storing an annotation dataset managed independently from the root dataset, the annotation dataset comprising a plurality of fields, each field in the plurality of fields comprising annotation data and a row identifier, the row identifier comprising a data structure storing a positional mapping to the root dataset and a row in the plurality of rows;
    performing a JOIN operation on the annotation dataset and the root dataset, the performing of the JOIN operation generating an unordered dataset, wherein a first set of splits in the root dataset in the unordered dataset are misaligned relative to a corresponding second set of splits of the annotation dataset, wherein the first set of splits and the second set of splits are misaligned relative to split identifiers present in both the first set of splits and the second set of splits;
    grouping a plurality of rows in the unordered dataset into a plurality of buckets, the grouping performed based on the first set of splits, wherein at least one bucket in the plurality of buckets includes a first split in the first set of splits and a second split in the second set of splits, the first split and second splits comprising misaligned splits;
    sorting each bucket, the sorting comprising sorting each bucket independently; and
    combining each sorted bucket into a sorted dataset.

2. The method of claim 1, the performing a JOIN operation comprising joining the annotation dataset to the root dataset.

3. The method of claim 1, further comprising generating a mapping of files and splits of the annotation dataset to corresponding files and splits of the root dataset.

4. The method of claim 3, the generating the mapping comprising reversing an annotation-to-root mapping stored within a metadata file associated with the annotation dataset.

5. The method of claim 3, the grouping the plurality of rows comprising:
    extracting a relative split number for each of the plurality of rows; and
    mapping each of the relative split numbers to a split number of the root dataset.

6. The method of claim 3, the grouping the plurality of rows further comprising extracting a relative row number and relative split number associated with the row.

7. The method of claim 6, the sorting comprising sorting the rows using only the relative row number and split number.

8. A non-transitory computer readable storage medium for tangibly storing computer program instructions capable of being executed by a computer processor, the computer program instructions defining steps of:
    storing a root dataset, the root dataset storing a plurality of rows;
    storing an annotation dataset managed independently from the root dataset, the annotation dataset comprising a plurality of fields, each field in the plurality of fields comprising annotation data and a row identifier, the row identifier comprising a data structure storing a positional mapping to the root dataset and a row in the plurality of rows;
    performing a JOIN operation on the annotation dataset and the root dataset, the performing of the JOIN operation generating an unordered dataset, wherein a first set of splits in the root dataset in the unordered dataset are misaligned relative to a corresponding second set of splits of the annotation dataset, wherein the first set of splits and the second set of splits are misaligned relative to split identifiers present in both the first set of splits and the second set of splits;
    grouping a plurality of rows in the unordered dataset into a plurality of buckets, the grouping performed based on the first set of splits;
    sorting each bucket, the sorting comprising sorting each bucket independently; and
    combining each sorted bucket into a sorted dataset.

9. The non-transitory computer readable storage medium of claim 8, the performing a JOIN operation comprising joining the annotation dataset to the root dataset.

10. The non-transitory computer readable storage medium of claim 8, the computer program instructions further defining the step of generating a mapping of files and splits of the annotation dataset to corresponding files and splits of the root dataset.

11. The non-transitory computer readable storage medium of claim 10, the generating the mapping comprising reversing an annotation-to-root mapping stored within a metadata file associated with the annotation dataset.

12. The non-transitory computer readable storage medium of claim 10, the grouping the plurality of rows comprising:
    extracting a relative split number for each of the plurality of rows; and
    mapping each of the relative split numbers to a split number of the root dataset.

13. The non-transitory computer readable storage medium of claim 10, the grouping the plurality of rows further comprising extracting a relative row number and relative split number associated with the row.

14. The non-transitory computer readable storage medium of claim 13, the sorting comprising sorting the rows using only the relative row number and split number.

15. An apparatus comprising:
    a processor; and a storage medium for tangibly storing thereon program logic for execution by the processor, the stored program logic causing the processor to perform operations of:

storing a root dataset, the root dataset storing a plurality of rows;

storing an annotation dataset managed independently from the root dataset, the annotation dataset comprising a plurality of fields, each field in the plurality of fields comprising annotation data and a row identifier, the row identifier comprising a data structure storing a positional mapping to the root dataset and a row in the plurality of rows;

performing a JOIN operation on the annotation dataset and the root dataset, the performing of the JOIN operation generating an unordered dataset, wherein a first set of splits in the root dataset in the unordered dataset are misaligned relative to a corresponding second set of splits of the annotation dataset, wherein the first set of splits and the second set of splits are misaligned relative to split identifiers present in both the first set of splits and the second set of splits;

grouping a plurality of rows in the unordered dataset into a plurality of buckets, the grouping performed based on the first set of splits;

sorting each bucket, the sorting comprising sorting each bucket independently; and combining each sorted bucket into a sorted dataset.

16. The apparatus of claim 15, the performing a JOIN operation comprising joining the annotation dataset to the root dataset.

17. The apparatus of claim 15, further comprising generating a mapping of files and splits of the annotation dataset to corresponding files and splits of the root dataset.

18. The apparatus of claim 17, the generating the mapping comprising reversing an annotation-to-root mapping stored within a metadata file associated with the annotation dataset.

19. The apparatus of claim 17, the grouping the plurality of rows comprising:

extracting a relative split number for each of the plurality of rows; and mapping each of the relative split numbers to a split number of the root dataset.

20. The apparatus of claim 17, the grouping the plurality of rows further comprising extracting a relative row number and relative split number associated with the row; and sorting the rows using only the relative row number and split number.

* * * * *